(12) United States Patent
Fertig

(10) Patent No.: US 8,408,186 B2
(45) Date of Patent: Apr. 2, 2013

(54) FUEL CONSERVATION DEVICE

(76) Inventor: Andrew L. Fertig, Kent, OH (US)

( * ) Notice: Subject to any disclaimer, the term of this patent is extended or adjusted under 35 U.S.C. 154(b) by 295 days.

(21) Appl. No.: 12/776,545

(22) Filed: May 10, 2010

(65) Prior Publication Data

US 2010/0288245 A1    Nov. 18, 2010

Related U.S. Application Data

(60) Provisional application No. 61/179,080, filed on May 18, 2009.

(51) Int. Cl.
F02G 5/00 (2006.01)
(52) U.S. Cl. ......... 123/557; 123/545; 123/547; 123/553
(58) Field of Classification Search .................. 123/557, 123/545, 547, 553
See application file for complete search history.

(56) References Cited

U.S. PATENT DOCUMENTS

| | | | | |
|---|---|---|---|---|
| 1,267,185 A | * | 5/1918 | Coffman ....................... | 165/103 |
| 2,059,920 A | * | 11/1936 | Weatherhead, Jr. ............ | 285/341 |
| 2,090,336 A | | 8/1937 | Stack | |
| 2,197,236 A | | 4/1940 | Bowen et al. | |
| 3,633,553 A | | 1/1972 | Holzapfel | |
| 3,738,334 A | * | 6/1973 | Farr .............................. | 123/557 |
| 3,935,901 A | | 2/1976 | Virgil | |
| 3,986,486 A | * | 10/1976 | Rabbiosi ....................... | 123/557 |
| 3,989,019 A | * | 11/1976 | Brandt et al. .................. | 123/557 |
| 4,091,782 A | | 5/1978 | Dunnam | |
| 4,180,036 A | | 12/1979 | Wolf | |
| 4,294,219 A | | 10/1981 | Rowe | |
| 4,323,043 A | * | 4/1982 | Alderson ....................... | 123/557 |
| 4,370,970 A | * | 2/1983 | Kunz ............................ | 123/557 |
| 4,397,288 A | * | 8/1983 | Kelling ......................... | 123/557 |
| 4,436,075 A | * | 3/1984 | Campbell et al. ............. | 123/557 |
| 4,567,857 A | * | 2/1986 | Houseman et al. ............. | 123/3 |
| 4,606,320 A | * | 8/1986 | McGee .......................... | 123/557 |
| 4,612,896 A | * | 9/1986 | Leibrand, Sr. ................ | 123/557 |
| 4,700,047 A | * | 10/1987 | Crossett et al. ................ | 219/205 |
| 4,733,636 A | * | 3/1988 | Harris et al. .................... | 122/39 |
| 4,883,040 A | * | 11/1989 | Rocky ........................... | 123/557 |
| 4,984,555 A | * | 1/1991 | Huang ........................... | 123/545 |
| 5,022,851 A | | 6/1991 | Reiser et al. | |
| 5,328,355 A | | 7/1994 | Kobayashi et al. | |
| 5,596,973 A | * | 1/1997 | Grice ............................ | 123/557 |
| 6,112,713 A | * | 9/2000 | Kiel ........................ | 123/142.5 R |
| 6,729,609 B2 | | 5/2004 | Winch | |

* cited by examiner

*Primary Examiner* — Marguerite McMahon
*Assistant Examiner* — James Kim
(74) *Attorney, Agent, or Firm* — Renner, Kenner, Greive, Bobak, Taylor & Weber

(57) ABSTRACT

A fuel conservation device for a combustion engine includes a heat-exchanging tube disposed through a heating coil that is contained within a housing containing coolant. The heat-exchanging tube is adapted to be coupled inline with a fuel line used to supply fuel from a gas tank to a fuel management device, such as a carburetor provided by the engine. In addition, the heating coil is configured to be coupled to an exhaust pipe coupled to the engine, so as to be heated by the hot exhaust gases generated as it operates. A radiator fluidly coupled to the housing cools the coolant, so that the fuel passing through the fuel line is maintained at a temperature just below the boiling point of the fuel.

8 Claims, 2 Drawing Sheets

FUEL CONSERVATION DEVICE

CROSS-REFERENCE TO RELATED APPLICATION

This application claims the benefit of U.S. Provisional Application No. 61/179,080 filed May 18, 2009, the specification of which is incorporated herein by reference.

TECHNICAL FIELD

Generally, the present invention relates to combustion engines. In particular, the present invention relates to devices used to heat fuel supplied to combustion engines. More particularly, the present invention relates to a fuel conservation device that utilizes heated exhaust gases from a combustion engine to heat the fuel supplied thereto, in order to increase the efficiency at which the fuel is utilized.

BACKGROUND ART

Combustion engines operate using petroleum-based fuels that are combusted to generate mechanical power, such as that used to propel a vehicle. Thus, fuel is typically delivered from a fuel tank to either a carburetor or to fuel injectors that modulate the amount of fuel that is to be delivered to the combustion chambers of the engine. In particular, carbureted engines utilize jets to adjust the amount of fuel that is metered into air entering the intake of the engine prior to reaching the combustion chamber. Whereas, fuel-injected engines utilize computer-controlled fuel injectors to precisely meter the fuel into air that is drawn into the engines' air intake.

Thus, during the operation of the engine, fuel is drawn from a fuel tank where it generally attains the ambient temperature of its surrounding environment, which is typically between 0 and 100 degrees Fahrenheit. Because of the relatively low temperature of the fuel that is delivered to the engine, it is incompletely burned during combustion, resulting in reduced fuel efficiency and increased emissions.

In the past, efforts have been made to design devices that are capable of heating fuel to increase the efficiency at which it is used by the combustion engine. However, such devices are complex and require significant disassembly of the vehicle in order to install. In addition, some of these fuel heating devices unnecessarily bring the heating element in close proximity to the fuel tank, which creates a significant explosion risk. Moreover, due to their complexity, such devices are costly and are less likely to be adopted by individuals seeking improved fuel economy from their vehicles.

Therefore, there is a need for a cost-effective fuel conservation device that is configured to heat an engine's fuel to a temperature that approaches, but is just below, its boiling point. In addition, there is a need for a fuel conservation device that is user-friendly and can be readily installed in a vehicle. Furthermore, there is a need for a fuel conservation device that can be adjusted based on the amount of heat needed to increase the fuel temperature.

SUMMARY OF INVENTION

In light of the foregoing, it is a first aspect of the present invention to provide a fuel conservation device for a combustion engine maintaining a fuel line and an exhaust, said device comprising a heat-exchanging tube having an inlet and an outlet, wherein said inlet and outlet of said heating tube are adapted to be coupled inline with the fuel line; a hollow heating coil disposed about said heating tube; and an inlet and outlet exhaust extension adapted to be attached to said exhaust, wherein said inlet coupling receives one end of said coil and said outlet receives another end of said coil, and wherein during the operation of the engine, the exhaust fumes travel through said coil to heat the fuel traveling through the heat-exchanging tube to increase the evaporation rate of the fuel during combustion.

It is another aspect of the present invention to provide a fuel conservation device wherein said inlet and outlet couplings comprise compression fittings.

Yet another aspect of the present invention is to provide a fuel conservation device further comprising a housing enclosing said heat-exchanging tube and said coil.

It is a further aspect of the present invention to provide a fuel conservation device wherein said housing contains coolant to regulate the temperature of said coil.

Yet another aspect of the present invention is to provide a fuel conservation device further comprising a radiator operatively coupled to said housing to cool said coolant.

It is another aspect of the present invention to provide a fuel conservation device for a combustion engine receiving fuel from a fuel line, the engine emitting hot exhaust gases via an exhaust, the fuel conservation device comprising a housing; a heating coil disposed within said housing, said coil having an inlet and an outlet adapted to be coupled to said exhaust, so as to be heated by the hot exhaust gases, said inlet having an inlet collector disposed within the exhaust to capture the exhaust gases; and a heat-exchange tube passing through said vessel and received through said heating coil, said heat-exchange tube having an inlet and an outlet adapted to be coupled inline with the fuel line, wherein fuel passing through said heat-exchange tube is heated from the radiant heat imparted from the hot exhaust gases passing through the heating coil.

Yet a further aspect of the present invention is to provide a method of conserving fuel comprising providing a combustion engine having a fuel management device configured to receive fuel via a fuel line, said engine having an exhaust; providing a fuel conservation device having a heating coil with an inlet end and an outlet end, and a heat-exchanging tube disposed through said coil, said heat-exchanging tube having an inlet and an outlet; coupling said inlet end and outlet end of said heating coil to said exhaust; coupling said inlet and said outlet of said heat-exchanging tube inline with said fuel line; operating said engine to emit hot exhaust gases through said heating coil; and heating the fuel to a point just below its boiling point.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
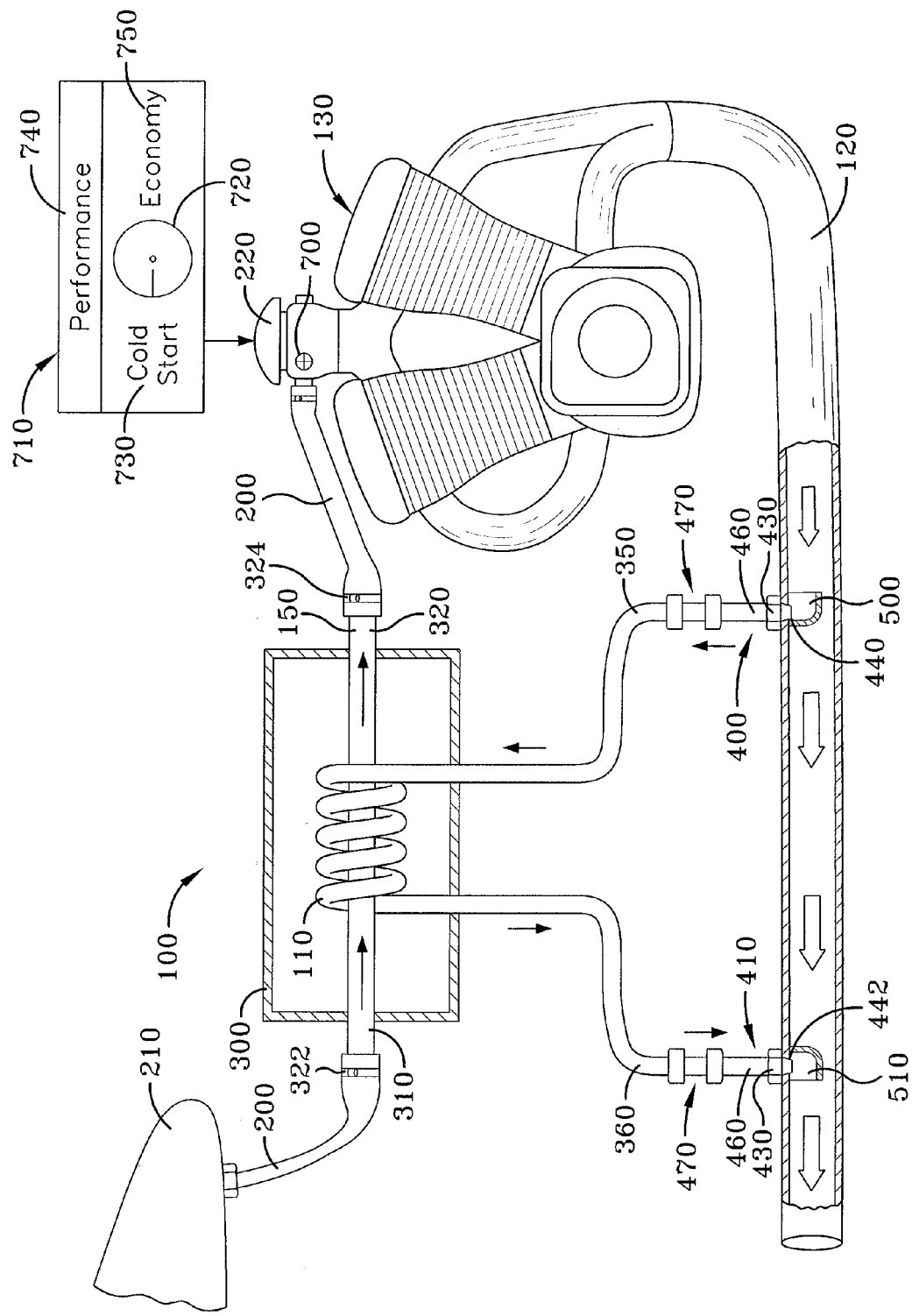
FIG. 1 is a schematic view of a fuel conservation device in accordance with the concepts of the present invention.

A fuel conservation device is generally referred to by the numeral 100, as shown in FIG. 1 of the drawings. The fuel conservation device 100 includes a heating coil 110 that receives hot exhaust fumes from an exhaust 120 of a combustion engine 130, such as that maintained by a motorcycle or an automobile for example. Passing through the heating coil 110 is a heat-exchanging tube 150, which is installed inline with a fuel line 200 that supplies petroleum-based fuel, such as gasoline, from a fuel tank 210 to a fuel management device 220, such as a carburetor/electronic fuel injection (EFI) system, which is maintained by the engine 130. Thus, as the fuel moves through the heat-exchanging tube 150, it is heated by the coil 110 to a temperature that approaches, but is just below, the boiling point of the fuel. The increased temperature allows the fuel to evaporate at an increased rate, such that combustion of the fuel delivered to the engine 130 by the carburetor/EFI system 220 is more completely burned during the combustion process. As such, the engine 130 is able to utilize the fuel more efficiently and, therefore, is able to generate more power for a given amount of fuel.

Specifically, the fuel conservation device 100 includes a housing 300, which may be formed from any suitable heat-resistant material, such as high-temperature plastic, steel, aluminum, or the like. Disposed within the housing 300 is the heat-exchanging tube 150, which extends just beyond the width dimension of the housing 300 to form an inlet 310 and an outlet 320 that are fluidly coupled inline with the fuel line 200 via suitable fasteners, such as clamps 322-324. The heat-exchanging tube 150 may be comprised of any suitable material, such as high-temperature plastic, steel, aluminum, or the like. Wound around the heat-exchanging tube 150 is the heating coil 110, which maintains an inlet end 350 and an outlet end 360. The heating coil 110 is substantially hollow and may be formed of any suitable material, such as aluminum, steel, stainless steel, and the like. It should also be appreciated that the coil 110 is spaced from the heat-exchanging tube 150 by an air gap, although in other embodiments, the coil 110 may come into direct contact with the heat-exchanging tube 150. The inlet end 350 and the outlet end 360 of the heating coil 110 are attached to the exhaust 120 via a pair of respective inlet and outlet exhaust extensions 400 and 410 that are mounted to respective inlet and outlet apertures 440 and 442. Because both the inlet and outlet exhaust extensions 400 and 410 are structurally equivalent, only the inlet exhaust extension 400 will be described. As such, the inlet exhaust extension 400 comprises an attachment fitting 430 that is threaded or otherwise attached to the inlet aperture 440 that is bored into the exhaust 120. Extending from the attachment fitting 430 is an extension tube 460, which is attached to the inlet end 350 of the heating coil 110 via a coupler 470, such as a compression coupler. The compression coupler 470 may comprise a compression fitting at each end that is configured to compressively fluidly couple the inlet end 350 of the heating coil 110 with the extension tube 460. Similarly, the extension tube 460 of the outlet extension 410 is compressively fluidly coupled to the outlet end 360 of the heating coil 110 via the compression coupler 470. Alternatively, it should be appreciated that in lieu of a compression coupler, the coupler 470 may comprise any other suitable coupling device. It should be appreciated that the inlet and outlet exhaust extensions 400,410 may be foil led from any suitable material, such as high-temperature plastic, steel, aluminum, brass, and the like. In addition, the extension tube 460 is flexible and may be of any desired length to facilitate the attachment of the heating coil 110 to the exhaust 120. Thus, because mounting locations in the exhaust 120 for the inlet and outlet exhaust extensions 400,410 may be limited, the extension tube 460 serves to extend or offset the compression coupler 470 to a location that facilitates its attachment to the inlet and outlet ends 350,360 of the heating coil 110. It should be appreciated that the inlet and outlet ends 350,360 of the heating coil 110 may be any desired length to facilitate the installation of the device 100. Extending from the attachment fittings 430 of the inlet and outlet exhaust extensions 400,410, which are disposed within the exhaust 120, are respective inlet and outlet collectors 500,510. The inlet collector 500 is substantially cup-shaped to collect and route exhaust gases that have been expelled by the engine 130 into the heating coil 110, while the outlet collector 510 returns the exhaust gases back into the exhaust after passing through the heating coil 110.

The heating coil 110 and the heat-exchanging tube 150 are enclosed in the housing 300 to prevent the thermal transfer of heat from the coil 110 to surrounding structures maintained by the vehicle or apparatus. Furthermore, various materials, such as insulation, metal shielding, and ceramic material, may be disposed in the area between the heating coil 110 and the heat-exchanging tube 150 to regulate the transfer of heat from the coil 110 to the heat-exchanging tube 150 in order to achieve the desired temperature of the fuel.

Figure 2:
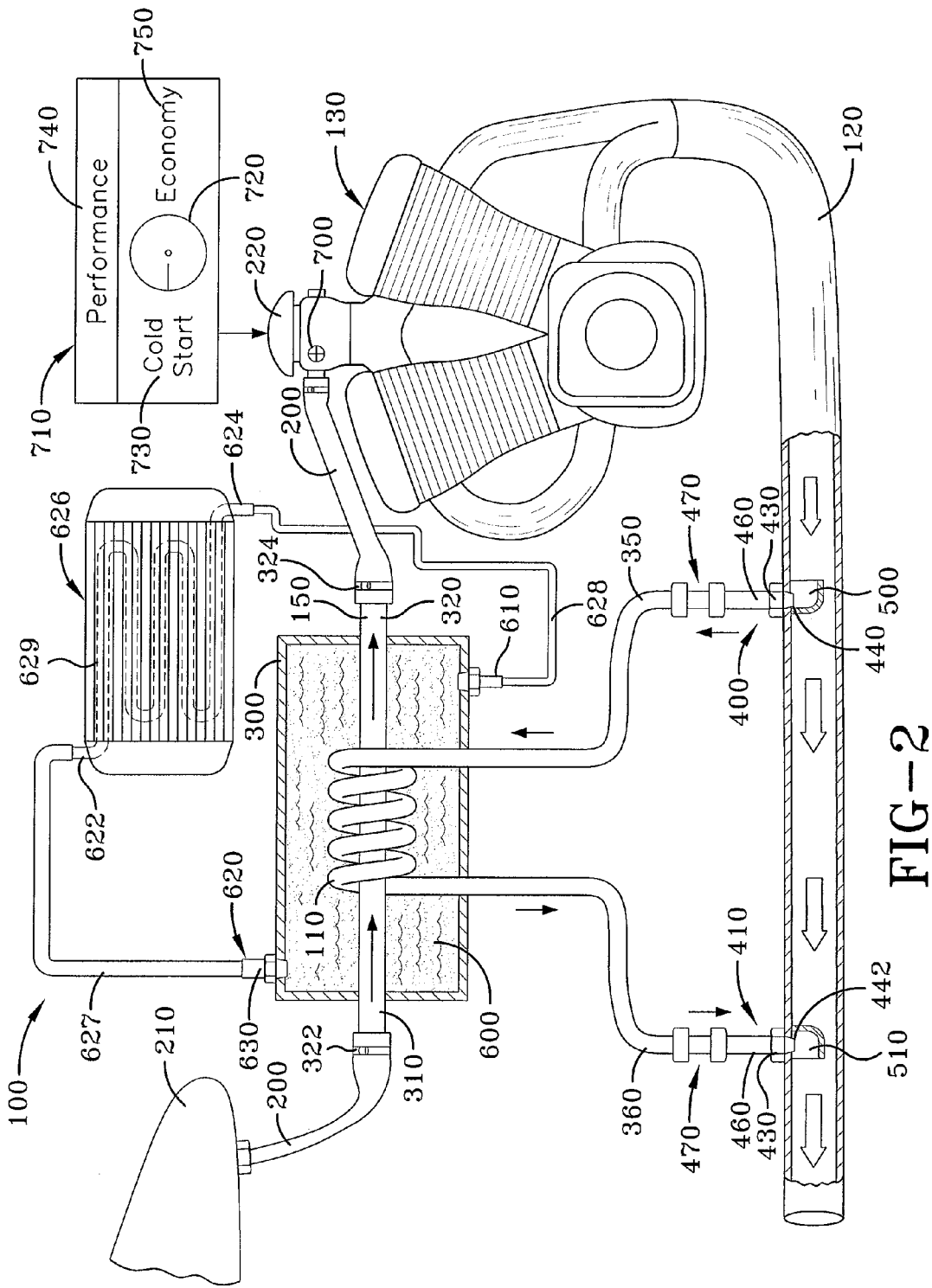
FIG. 2 is a schematic view of the fuel conservation device utilizing a cooling radiator in accordance with the concepts of the present invention.

In another aspect of the present invention, as shown in FIG. 2, the housing 300 may be configured as a liquid-tight vessel that maintains a coolant liquid 600 that is capable of absorbing heat in order to regulate the temperature of the heating coil 110. In order to regulate the temperature of the heating coil 110 via the coolant 600, the housing 300 includes a coolant inlet 610 and a coolant outlet 620, which are used to fluidly couple the housing 300 to respective inlet and outlets 622 and 624 of a radiator 626 via respective inlet and outlet tubes 627 and 628. Within the radiator 626 is a radiator coil 629 through which the coolant 600 passes as it travels between the radiator inlet 622 and the radiator outlet 624. The operation of the radiator 626 serves to cool the coolant 600 which absorbs heat from the heating coil 110 and the heat-exchanging tube 150. This allows the device 100 to control the amount of heat transferred between the heating coil 110 and the heat-exchanging tube 150 so as to maintain the temperature of the fuel passing through the heat-exchanging tube 150 within a desired or predetermined temperature range.

In order to enable the circulation of the coolant 600 through the radiator 626, the diameter of the coolant outlet 620 and the inlet tube 627 is larger than the diameter of the radiator inlet 622 and the radiator coil 629, while the diameter of the radiator outlet 624, the outlet tube 628, and the coolant inlet 610 are smaller than any of the coolant outlet 620, outlet tube 627, and radiator coil 629. For example, the diameter of the coolant outlet 620 and the outlet tube 627 may be approximately 0.500", the diameter of the radiator inlet 622 and the radiator coil 629 may be approximately 0.375", and the diameter of the radiator outlet 624, the outlet tube 628, and the coolant inlet 610 may be approximately 0.250", although any other suitable diameter dimensions may be used. As such, the diameter of the path of the coolant 600 beginning at the coolant outlet 620 where it exits the housing 300 becomes progressively narrower to generate a nozzle effect that increases the pressure as the coolant 600 temperature increases. The increased pressure enables the coolant to circulate out of the housing 300 and into the radiator 626 before returning to the housing 300. It should be appreciated that such circulation of the coolant 600 through the radiator 626 is performed without the need for a pump, which would otherwise draw parasitic power from the engine 130.

As such, with the structural components of the fuel conservation device 100 set forth, the following discussion will present the steps in which it is placed into use with the combustion engine 130. Initially, a section of the fuel line 200 is cut out and removed, thereby creating openings for the inlet 310 and the outlet 320 of the heat-exchanging tube 150 to be received are retained therewithin by suitable fasteners, such as clamps 322,324. Next, the inlet and outlet couplers 400 and 410 are installed in the exhaust 120, such that the inlet coupler 400 is upstream of the exhaust flow of the outlet coupler 410. It should be appreciated that the couplers 400,410 may be installed by boring the apertures 440,442 in the exhaust 120 to enable the attachment fittings 430 associated with each of the couplers 400,410 to be threadably installed therein. Next, the inlet and outlet ends 350,360 of the heating coil 110 are coupled to respective inlet and outlet exhaust extensions 400, 410 via compression couplers 470 in order to route heated exhaust fumes from the exhaust 120 through the heating coil 110 in order to heat the fuel passing through the heat-exchanging tube 150.

It should also be appreciated that in the case of a carbureted engine, the carburetor jets, which control the metering of fuel into the air intake of the engine 130, may be further adjusted to reduce the amount of fuel input in order to offset the increased power generated as a result of the more complete burning of fuel enabled by the conservation device 100. Similarly, in the case of EFI-based engines 130, the amount of fuel metered into the air intake may be reduced by directly modifying the control sequence of an associated control module that controls the fuel-injection system. In addition, an external fuel controller may be coupled to the fuel-injection system, which allows the amount of fuel metered into the engine 130 by the injection system to be reduced. Alternatively, the fuel controller may also be used to increase the fuel metered into the engine 130 to increase horsepower, while still consuming substantially less fuel than would be achieved if the engine 130 did not have the fuel conservation device 100.

In another aspect, the fuel conservation device 100 provides an adjustable jet 700 that is in fluid communication with the fuel line 200 and the carburetor 220. The adjustable jet 700 controls the amount of fuel that is permitted to pass from the fuel line 200 and into the engine 130 during its operation. Coupled to the adjustable jet 700 is a control unit 710 that includes a setting dial 720 that provides a plurality of settings, which include a cold-start setting 730, a performance setting 740, and an economy setting 750. As such, when the dial 720 is set to the cold-start setting 730, the adjustable jet 700 is fully opened to allow a large amount of fuel to be received by the carburetor 220, and thus is desirable when the engine 130 is to be started when it is cold. Once the engine 130 has warmed, the dial 720 may be placed into either of the performance or economy settings 740,750. If the dial is placed into the economy setting 750, the adjustable jet 700 significantly reduces the amount of fuel permitted to enter the engine 130, and as such, the greatest amount of fuel economy is obtained. Alternatively, if the dial 720 is placed into the performance setting 740, the adjustable jet 700 permits less fuel to enter the carburetor 220 than in the cold-start setting 730 but more than the economy setting 750. As a result, the engine 130 produces more horsepower than would be achieved if the dial 720 were set to the economy setting 750.

It should be appreciated that the fuel conservation device 100 is configured such that the heated exhaust gases are routed from the exhaust 120 and to the fuel line 200, which is beneficial over prior-art systems that route the fuel away from the fuel line and into the exhaust where it is heated before it is routed to the engine. Thus, in prior-art systems, because the exhaust is largely exposed to the environmental elements, it is subject to corrosion and rust, which could lead to a leak in the fuel lines that are routed near the exhaust. However, in the present invention 100, because the fuel line 200 is kept away from the exhaust 120, the fuel line 200 is not subject to being corroded with the exhaust 120, and as a result, the risk for a potential fuel leak therefrom is substantially reduced.

It will, therefore, be appreciated that one advantage of the present invention is that a fuel conservation device has reduced complexity and is user-friendly and easily installable or retrofit to the fuel line and exhaust of a combustion engine. Another advantage of the present invention is that the fuel conservation device provides a heating coil that can be adjusted depending on the amount of heat needed. Still another advantage of the present invention is that the fuel conservation device provides a housing that encloses the heating coil, a heat-exchanging tube, and an amount of coolant to regulate the temperature of the fuel flowing therethrough. Yet another advantage of the present invention is that the fuel conservation device burns fuel more efficiently and more completely, thus generating less emissions and pollution. Another advantage of the present invention is that an adjustable jet provided by the fuel conservation device adjusts the amount of fuel delivered to the engine of a vehicle to enable cold-start operation, increased horsepower performance operation, and economy operation.

Thus, it can be seen that the objects of the present invention have been satisfied by the structure and its method for use presented above. While in accordance with the Patent Statutes, only the best mode and preferred embodiments have been presented and described in detail, it being understood that the invention is not limited thereto and thereby.

The invention claimed is:

1. A fuel conservation device for a combustion engine receiving fuel from a fuel line, the engine emitting hot exhaust gases via an exhaust, the fuel conservation device comprising:
   a housing, said housing carrying coolant;
   a heating coil disposed within said housing and in at least partial contact with said coolant, said coil having an inlet and an outlet adapted to be coupled to said exhaust, so as to be heated by the hot exhaust gases, said inlet having an inlet collector disposed within the exhaust to capture the exhaust gases; and
   a heat-exchange tube passing through said housing and received through said heating coil, said heat-exchange tube having an inlet and an outlet adapted to be coupled inline with the fuel line;
   wherein the temperature of said heat-exchange tube is controlled by said coolant, such that fuel passing through said heat-exchange tube is heated without being boiled.

2. The fuel conservation device of claim 1, wherein said inlets and outlets of said heating coil comprise compression fittings.

3. The fuel conservation device of claim 1, further comprising a radiator fluidly coupled to an upper portion of said housing by an inlet tube and fluidly coupled to a lower portion of said housing by an outlet tube, said coolant flowing through said radiator.

4. The fuel conservation device of claim 3, wherein the diameter of said inlet tube is greater than the diameter of said outlet tube.

5. The fuel conservation device of claim 1, wherein said heat-exchange tube contacts said heating coil.

6. The fuel conservation device of claim 1, wherein said heat-exchange tube is separated from said heating coil by a gap.

7. A method of conserving fuel comprising:
   providing a combustion engine having a fuel management device configured to receive fuel via a fuel line, said engine having an exhaust;
   providing a fuel conservation device having a heating coil with an inlet end and an outlet end, and a heat-exchanging tube disposed through said coil, said heat-exchanging tube having an inlet and an outlet, wherein said heating coil and said heat-exchanging tube are disposed in a housing;

providing a coolant in said housing, so as to be in contact with said coil to control the temperature of said heat-exchanging tube;

coupling a radiator to said housing to cool said coolant to regulate the heat emitted by said heating coil; coupling said inlet end and outlet end of said heating coil to said exhaust;

coupling said inlet and said outlet of said heat-exchanging tube inline with said fuel line;

operating said engine to emit hot exhaust gases through said heating coil; and heating the fuel without being boiled to a point just below its boiling point.

8. The method of claim 7, further comprising:

adjusting said fuel management device to change the amount of fuel delivered to said engine.

* * * * *